(12) United States Patent
Iwamoto et al.

(10) Patent No.: US 8,894,130 B2
(45) Date of Patent: Nov. 25, 2014

(54) VEHICLE LOWER SECTION STRUCTURE

(75) Inventors: Hiroaki Iwamoto, Nagoya (JP); Koki Ikeda, Toyota (JP); Yasuyuki Hihara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/985,141

(22) PCT Filed: Feb. 15, 2011

(86) PCT No.: PCT/JP2011/053182
§ 371 (c)(1),
(2), (4) Date: Aug. 13, 2013

(87) PCT Pub. No.: WO2012/111098
PCT Pub. Date: Aug. 23, 2012

(65) Prior Publication Data
US 2013/0320713 A1      Dec. 5, 2013

(51) Int. Cl.
*B60J 7/00*   (2006.01)
*B62D 25/20*  (2006.01)
*B60N 2/06*   (2006.01)
*B62D 25/02*  (2006.01)
*B60N 2/015*  (2006.01)

(52) U.S. Cl.
CPC  *B62D 25/20* (2013.01); *B60N 2/06* (2013.01); *B62D 25/025* (2013.01); *B62D 25/2036* (2013.01); *B60N 2/015* (2013.01)
USPC ............... 296/187.08; 296/65.13; 296/193.07

(58) Field of Classification Search
CPC .................................. B62D 25/20; B60N 2/06
USPC .......... 296/193.07, 187.08, 187.12, 63, 65.13
See application file for complete search history.

(56) References Cited

U.S. PATENT DOCUMENTS 5,104,176 A * 4/1992 Mrozowski ............... 296/193.07
6,129,412 A * 10/2000 Tanuma ........................ 296/204

(Continued)

FOREIGN PATENT DOCUMENTS

| DE | 295 17 797 U1 | 3/1996 |
| EP | 1 544 027 A2 | 6/2005 |
| JP | U-61-125853 | 8/1986 |
| JP | A-64-22681 | 1/1989 |
| JP | U-02-63281 | 5/1990 |

(Continued)

OTHER PUBLICATIONS

Oct. 10, 2013 Extended European Search Report issued in European Application No. 11858749.2.

*Primary Examiner* — Joseph D Pape
(74) *Attorney, Agent, or Firm* — Oliff PLC

(57) ABSTRACT

A vehicle lower section structure is obtained that has a simple structure and is capable of increasing the rigidity and strength of a framework structure that is long in the vehicle front-rear direction. A vehicle lower section structure includes: an upper panel including a pair of respectively vehicle-downwards facing joining faces that are separated from each other in the vehicle width direction; a lower panel that with the upper panel configures a framework structure that is long in the vehicle front-rear direction and has a closed cross-section by the joining faces of the upper panel being joined to vehicle-upwards facing joining faces of the lower panel; and a seat rail that is long in the vehicle front-rear direction and is fixed to a portion of the upper panel that configures an upper wall of the closed cross-section of the framework structure.

4 Claims, 6 Drawing Sheets

(56) References Cited

U.S. PATENT DOCUMENTS 6,375,247 B1 * 4/2002 Volz et al. .................... 296/66
7,350,853 B2 * 4/2008 Fitze ...................... 296/193.07
7,434,871 B2 * 10/2008 Mizuma et al. ......... 296/193.07
8,544,794 B2 * 10/2013 Ciprian .................... 244/118.5

FOREIGN PATENT DOCUMENTS

| JP | A-5-208688 | 8/1993 |
| JP | A-2006-123731 | 5/2006 |
| JP | A-2007-50784 | 3/2007 |
| JP | A-2008-68720 | 3/2008 |

* cited by examiner

Related Art

VEHICLE LOWER SECTION STRUCTURE

TECHNICAL FIELD

The present invention relates to a vehicle lower section structure.

BACKGROUND ART

Structures are known wherein seat rails are attached to brackets respectively fixed to an inner panel and a floor panel that configure a rocker (see for example Japanese Patent Application Laid-Open (JP-A) No. 2007-050784). Structures are also known wherein seat rails are fixed to faces of a side sill and a tunnel that face each other along the vehicle width direction (see for example JP-A No. 2006-123731). Moreover, structures are known wherein vehicle width direction outside joining portions between a side sill inner and a side sill outer are configured so as to be aligned in an up-down direction (see for example JP-A No. H05-208688). Structures are also known wherein vehicle width direction inside joining portions between a side sill inner and a side sill outer are configured so as to be aligned in an up-down direction (see for example Japanese Utility Model Application Laid-Open (JU-A) No. S61-125853).

DISCLOSURE OF INVENTION

Technical Problem

An object of the present invention is to obtain a vehicle lower section structure that has a simple structure and is capable of increasing the rigidity and strength of a framework structure that is long in the vehicle front-rear direction.

Solution to Problem

A vehicle lower section structure according to a first aspect of the present invention includes: an upper panel including a pair of joining faces that respectively face vehicle-downward and that are separated from each other in a vehicle width direction; a lower panel including joining faces that face vehicle-upward, the lower panel configures a framework structure with the upper panel, the framework structure is long in a vehicle front-rear direction and has a closed cross-section by each of the joining faces of the upper panel being respectively joined to the joining faces of the lower panel; and a seat rail that is long in the vehicle front-rear direction and is fixed to a portion of the upper panel that configures an upper wall of the closed cross-section of the framework structure.

According to the above aspect, the upper panel and the lower panel are joined together by mutually aligning joining faces thereof in an up-down direction, thereby configuring the framework structure that is long in the vehicle front-rear direction and has a closed cross-section. The rigidity and strength with respect to bending of the framework structure is increased due to fixing the seat rail to the upper wall of the closed cross-section framework structure. Moreover, separation of the joining portions caused by bending in the up-down direction does not readily occur in the framework because the upper panel and the lower panel are configured by aligning in the up-down direction and joining together the upper panel and the lower pane. The framework structure is accordingly reinforced in particular with respect to bending in the up-down direction.

The vehicle lower section structure according to the above aspect can consequently increase the strength and rigidity of the framework structure that is long in the vehicle front-rear direction by means of a simple structure. Moreover, additional components such as a bracket for fixing the seat rail to the vehicle body can be omitted.

In the above aspect, configuration may be made further including: a collar member whose vehicle upper end side is fixed to an upper wall of the upper panel, and whose vehicle lower end side is fixed to a lower wall of the lower panel that faces the upper wall; and the seat rail is fastened to the collar member by a fastening, thereby fixing the seat rail to a portion of the upper panel that configures the upper wall of the framework structure.

According to the above aspect, the collar member that fastens the seat rail is respectively fixed to the mutually facing upper wall and the lower wall of the framework structure. The collar member accordingly connects the upper and lower walls of the framework structure, thereby functioning as a reinforcement member suppressing deformation (collapse) of the cross-sectional shape of the framework structure.

In the above aspect, configuration may be made wherein a portion of the upper wall of the upper panel to which the upper end side of the collar member is fixed and a portion of the lower wall of the lower panel to which the lower end side of the collar member is fixed are substantially parallel to each other.

According to the above aspect, the braced state of the collar member against collapse of the cross-sectional shape is easily maintained. A high reinforcement effect of the closed cross-section of the framework structure is accordingly obtained by the collar member.

In the above aspect, configuration may be made wherein the upper panel or the lower panel or both the upper panel and the lower panel extend in the vehicle width direction and configure at least a portion of a vehicle floor.

According to the above aspect, at least a portion of the vehicle floor extends in the vehicle width direction from either the upper panel or the lower panel or both the upper panel and the lower panel (the portion of the vehicle floor is integrally formed with either the upper panel or the lower panel). This is achieved because the upper panel and the lower panel are aligned in the up-down direction and are made as joint structure that configures the framework structure. The vehicle lower section structure can accordingly achieve a reduction in the number of components, and a reduction in the number of assembly steps.

In the above aspect, configuration may be made wherein: a rocker positioned at a vehicle width direction outer edge side of a vehicle floor and a center framework portion positioned at a vehicle width direction center of the vehicle floor are respectively formed as the framework structures; and the seat rail at a vehicle width direction outside is fixed to the upper wall configuring the closed cross-section of the rocker, and the seat rail at a vehicle width direction inside is fixed to the upper wall configuring the closed cross-section of the center framework portion.

According to the above aspect, the center framework portion is disposed between left and right rockers in the vehicle width direction, and the seat rails are respectively fixed to each of the framework structures. The framework structures at both vehicle width direction sides from a vehicle seat are accordingly reinforced while the vehicle seat is supported on the seat rails. Thus, a configuration is achieved that does away with the need for a bracket for fixing the seat rails.

Advantageous Effects of Invention

The vehicle lower section structure according to the present invention as described above exhibits excellent advantageous effect of being capable of increasing the rigidity and strength of the framework structure that is long in the vehicle front-rear direction

BEST MODE FOR CARRYING OUT THE INVENTION

Figure 1:
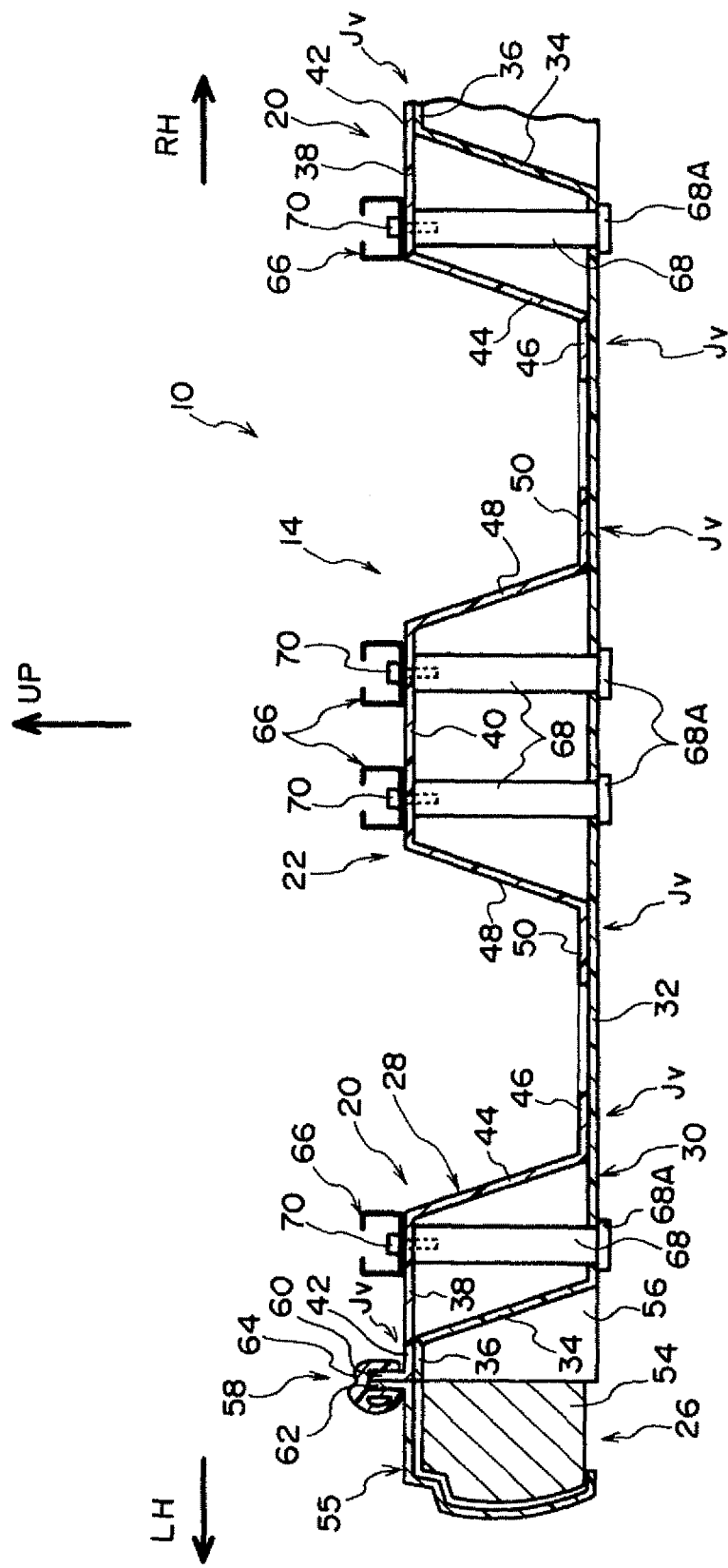
FIG. 1 is a cross-section taken along line 1-1 in FIG. 2, illustrating a vehicle lower section structure according to an exemplary embodiment of the present invention.

Explanation follows regarding a vehicle lower section structure 10 according to an exemplary embodiment of the present invention, with reference to FIG. 1 to FIG. 6. In the drawings, where appropriate: an arrow FR indicates the front direction in a vehicle front-rear direction; an arrow UP indicates the up direction in a vehicle up-down direction; an arrow RH indicates the vehicle right side when facing towards the front direction, this being one side in the vehicle width direction; and an arrow LH indicates the vehicle left side when facing towards the front direction, this being the other side in the vehicle width direction. Unless explicitly stated otherwise, where front, rear, up, down, left and right directions are employed in the following explanation, these are to be understood as front and rear in the vehicle front-rear direction, up and down in the vehicle up-down direction, and left and right as facing towards the front direction.

Figure 2:
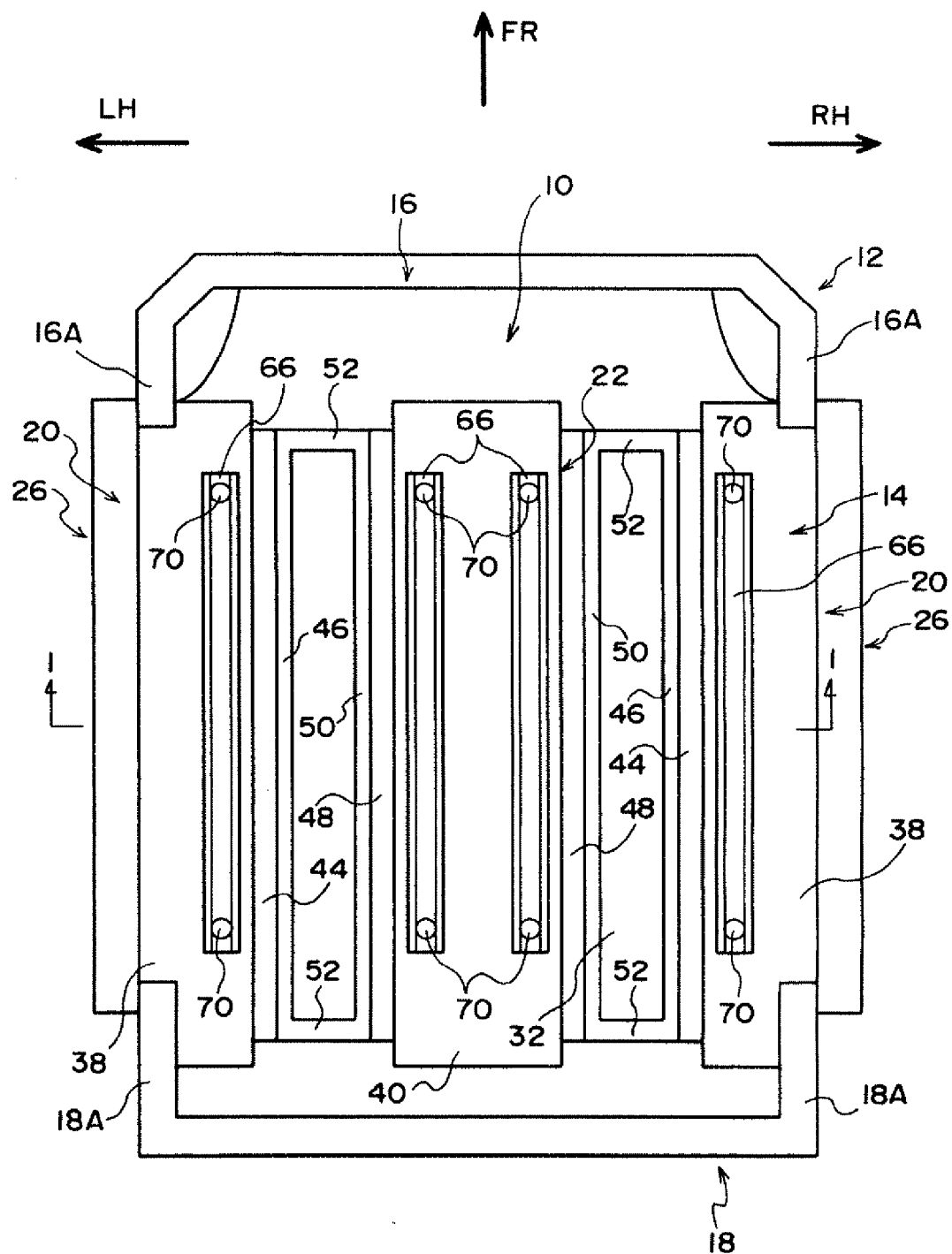
FIG. 2 is a plan view illustrating a vehicle lower section structure according to an exemplary embodiment of the present invention.

FIG. 2 is a schematic plan view illustrating an underbody 12 configuring a vehicle V applied with the vehicle lower section structure 10. As illustrated in FIG. 2, the underbody 12 includes a floor 14, a dashboard lower portion 16 that projects upward from a front end of the floor 14, and a lower back portion 18 that projects upward from a rear end of the floor 14. Front side walls 16A that turn in toward the vehicle rear side are provided to both vehicle width direction ends of the dashboard lower portion 16, and rear side walls 18A that turn in toward the vehicle front side are provided extending from both vehicle width direction ends of the lower back portion 18. The overall underbody 12 is accordingly formed in a bathtub shape (a bathtub shape with portions of side walls cut away) as illustrated in FIG. 2.

The floor 14 is formed overall in a substantially flat plate shape, and includes a pair of left and right rockers 20 and a center framework portion 22, that are respectively long in the front-rear direction and serve as framework structures. The rockers 20 configure framework members spanning from the dashboard lower portion 16 to the lower back portion 18 at vehicle width direction outer edges of the floor 14. The center framework portion 22 configures a framework member spanning from the dashboard lower portion 16 to the lower back portion 18 at a vehicle width direction central portion of the floor 14. As illustrated in FIG. 1, when viewed in cross-section orthogonal to their length direction, the rockers 20 and the center framework portion 22 have a closed cross-section structure. Moreover, as illustrated in FIG. 1 and FIG. 2, impact absorption portions 26 are provided at vehicle width direction outsides of the rockers 20.

The floor 14 is configured by joining together two members, namely an upper panel 28 and a lower panel 30 in aligned structure in an up-down direction. Specifically, as illustrated in FIG. 1, the lower panel 30 is configured including a bottom wall 32 as a substantially flat lower wall extending in a horizontal plane, and outside walls 34 that project upward from side peripheral edges of the bottom wall 32. Although omitted from illustration, a dashboard front wall configuring a front wall of the dashboard lower portion 16 projects upward from a front edge of the bottom wall 32, and a lower back rear wall configuring a rear wall of the lower back portion 18 projects upward from a rear edge of the bottom wall 32. Outer flanges 36 serving as joining faces that faces upward jut out in a substantially horizontal plane toward the vehicle width direction outside from upper edges of the outside walls 34.

The upper panel 28, serving as an upper wall facing the bottom wall 32, includes a left and right pair of rocker upper walls 38 and a center upper wall 40. The rocker upper walls 38 and the center upper wall 40 are formed substantially in a horizontal plane and flat. The rocker upper walls 38 and the center upper wall 40 are accordingly disposed substantially parallel to the bottom wall 32 (with the respective opposing faces parallel to each other).

Outer flanges 42 serving as joining faces that face downward and join together with the outer flanges 36 jut out in a substantially horizontal plane from vehicle width direction outer edges of the rocker upper walls 38. Rocker inner walls 44 drop downward from vehicle width direction inner edges of the rocker upper walls 38 so as to face the outside walls 34. Inner flanges 46 serving as joining faces that face downward and join together with the bottom wall 32 jut out toward the vehicle width direction inside from lower edges of the rocker inner walls 44. The bottom wall 32 serves as a joining face that face upward.

Center side walls 48 drop downward from both vehicle width direction edges of the center upper wall 40 so as to face towards each other. Center flanges 50 serving as joining faces that face downward and join together with the bottom wall 32 are provided to respective lower edges of the left and right center side walls 48 so as to jut out away from each other in the vehicle width direction. As illustrated in FIG. 2, front and rear end portions of the inner flanges 46 and the center flanges 50 are respectively coupled together by coupling flanges 52. Although omitted from illustration, a dashboard rear wall projects up at a front end of the upper panel 28 so as to face the dashboard front wall of the lower panel 30, configuring the dashboard lower portion 16. Moreover, a lower back front wall projects up at a rear end of the upper panel 28 so as to face the lower back rear wall of the lower panel 30, configuring the lower back portion 18.

The floor 14 (underbody 12) is configured by aligning in up-down direction and assembling together the upper panel 28 and the lower panel 30, joining together the outer flanges 36 and the outer flanges 42, and respectively joining the inner flanges 46, the center flanges 50 and the coupling flanges 52 to the bottom wall 32. In this state, the left and right rockers 20 are configured with frame-shaped closed cross-sections of substantially quadrilateral profile (parallelogram profile) enclosed by the bottom wall 32, the outside walls 34, the rocker upper walls 38 and the rocker inner walls 44. The center framework portion 22 is configured with a frame-shaped closed cross-section of substantially quadrilateral profile (trapezoidal profile) enclosed by the center upper wall 40, the left and right center side walls 48, and the bottom wall 32.

In the present exemplary embodiment, the relevant portions of the underbody 12 that includes the floor 14, the dashboard lower portion 16, and the lower back portion 18 are configured by joining together the upper panel 28 and the lower panel 30. Moreover, in the present exemplary embodiment, the upper panel 28 and the lower panel 30 are respectively configured from CFRP (Carbon Fiber Reinforced Plastic) as an example of a fiber reinforced plastic, with each of the joint locations being joined together for example by adhesive, fusion bonding or welding.

As mentioned above, the impact absorption portions 26 are provided at the vehicle width direction outsides of the left and right rockers 20. The impact absorption portions 26 are each configured by an EA (Energy Absorption) member 54 that is an energy absorbing member, and are each covered by an outer panel (side member outer) 55 that is an outer member. A vehicle width direction inner edge of the EA member 54 is fixed to a rib 56 that juts out from the outside wall 34 towards the vehicle width direction outside, and the outer panel 55 covers the EA member 54 from the upper side and the vehicle width direction outside. An upright flange 60 projects upward from a vehicle width direction outer edge of the outer flange 42 of the upper panel 28. An upright flange 62 projects upwards from a vehicle width direction inner edge of a portion of the outer panel 55 that covers the EA member 54 from the upper side. The upright flange 60 and the upright flange 62 are joined together by for example bonding, thereby fixing the outer panel 55 to the underbody 12.

A rocker step portion 58, that configures a lower edge of an opening portion through which an occupant enters and exits, is formed at a lower portion (the portion illustrated in FIG. 1) of the rocker 20 and the outer panel 55. The joining portion of the upright flange 60 and the upright flange 62 in the rocker step portion 58 is covered by an opening trim 64.

As illustrated in FIG. 1 and FIG. 2, seat rails 66 for supporting a vehicle seat on which the occupant sits, not illustrated in the drawings, are fixed to the underbody 12 described above such that the vehicle seat can slide in the front-rear direction. In the present exemplary embodiment, the seat rails 66 at the vehicle width direction outsides are fixed to the rocker upper walls 38 of the rockers 20. The seat rails 66 at the vehicle width direction inside are fixed to the center upper wall 40 of the center framework portion 22. Specific explanation follows thereof.

Collar nuts 68, respectively serving as collar members, are disposed inside the closed cross-sections of the respective rockers 20. Each of the collar nuts 68 includes a flange 68A at a lower end portion, and is adhered to a lower face of the bottom wall 32 at the flange 68A in a state penetrating the bottom wall 32. Each of the collar nuts 68 has a stepped structure at an upper end, and is adhered to a lower face of the rocker upper wall 38 at a large diameter portion, with a small diameter portion exposed from the rocker upper wall 38.

The respective seat rails 66 are fastened and fixed to the rocker upper walls 38 by screwing bolts 70, serving as fastenings, onto the collar nuts 68. In this state, the rocker upper walls 38 are interposed between the large diameter portions at the upper ends of the collar nuts 68 and the seat rails 66. The small diameter portions of each of the collar nuts 68 function as spacers, thereby suppressing an excessive compression load from acting on the rocker upper walls 38.

The collar nuts 68 are respectively disposed for the left and right seats inside the closed cross-section of the center framework portion 22. Each of the collar nuts 68 is adhered to the lower face of the bottom wall 32 at the flange 68A in a state penetrating the bottom wall 32. At the stepped upper end sides of each of the collar nuts 68, the respective collar nuts 68 are adhered to a lower face of the center upper wall 40 at the large diameter portion and the small diameter portion is exposed from the center upper wall 40. The respective seat rails 66 are fastened and fixed to the center upper wall 40 by screwing the bolts 70 onto the collar nuts 68. In this state, the center upper wall 40 is interposed between the large diameter portions of the upper ends of the collar nuts 68 and the seat rails 66. The small diameter portions of each of the collar nuts 68 function as spacers, thereby suppressing an excessive compression load from acting on the center upper wall 40.

As illustrated in FIG. 2, a front end side and a rear end side of each of the seat rails 66 that are long in the front-rear direction is fixed to a framework portion (the rocker upper walls 38, the center upper wall 40) of the underbody 12 by screwing the bolts 70 onto the collar nuts 68. Note that the seat rails 66 and the outer flanges 36 may also be adhered together in order to prevent for example water penetration. Moreover, a block material may be disposed inside the closed cross-sections of the rockers 20 so as to surround the collar nuts 68 and support the cross-section from inside thereof. Such a block material may be configured by a fiber reinforced plastic, or may be integrally configured with the collar nuts 68 from a metal such as aluminum.

Explanation follows regarding operation of the present exemplary embodiment.

In the vehicle lower section structure 10 of the configuration described above, the seat rails 66 are oriented with length direction in the same direction as the rockers 20 and the center framework portion 22, and respectively fixed thereto. Accordingly, the rockers 20 and the center framework portion 22 that are framework members extend in the front-rear direction are reinforced (given extra rigidity) against bending in the up-down direction and the vehicle width direction by the seat rails 66 that are fixed thereto (cross-section secondary moment is increased for the rockers 20 and the center framework portion 22).

Moreover, in the vehicle lower section structure 10, the upper panel 28 and the lower panel 30 are joined together by joining portions Jv that are aligned in the up-down direction (the outer flanges 42 to the outer flanges 36, the bottom wall 32 to the inner flanges 46, and the bottom wall 32 to the center flanges 50) to form the rockers 20 and the center framework portion 22. Deformation of the underbody 12 due to load in event of a frontal collision is accordingly suppressed for the vehicle V which is applied with the vehicle lower section structure 10.

Figure 3:
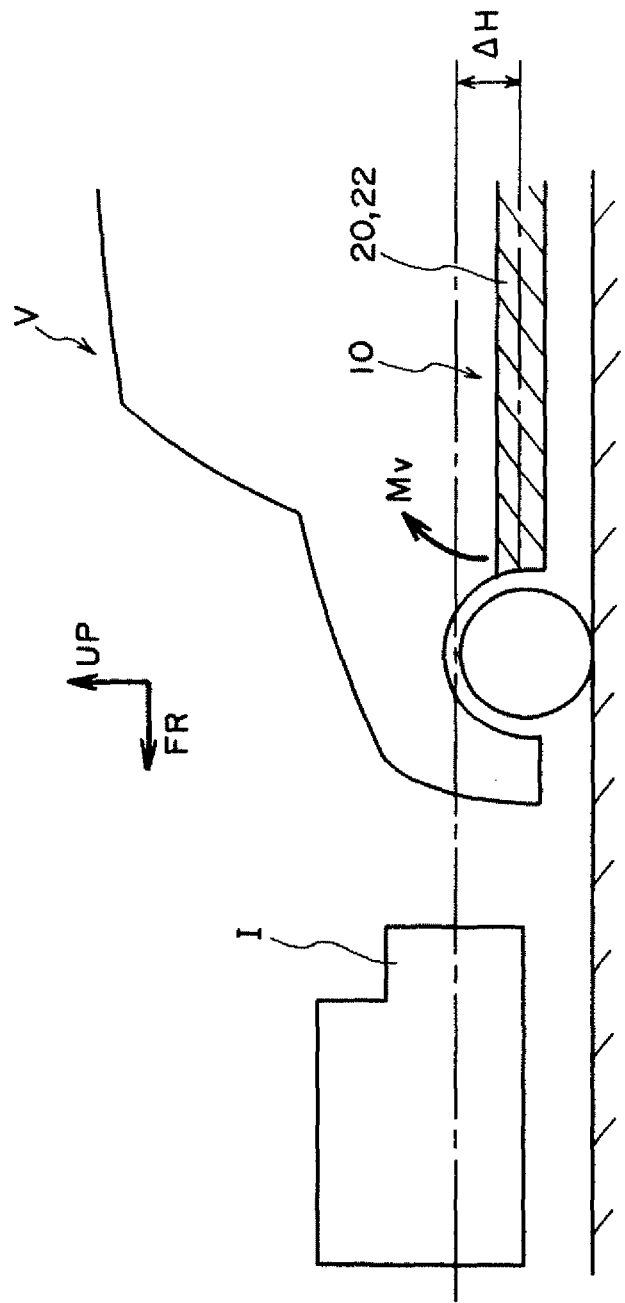
FIG. 3 is a schematic side view illustrating a frontal collision mode in a vehicle applied with a vehicle lower section structure according to an exemplary embodiment of the present invention.

To elaborate on the above point, as illustrated in FIG. 3, when the vehicle V is involved in a frontal collision, a bending moment Mv in the up-down direction arises in the rockers 20 and the center framework portion 22 according to a difference ΔH of a placement height of the rockers 20 and the center framework portion 22 with respect to a height of a collision position with a colliding object I. In the Comparative Example illustrated in FIG. 6, there is a concern of separation (opening up) of joining portions on the compression side (upper side) of a joint Jh, which is aligned in a left-right direction, due to bending in the up-down direction of the bending moment Mv. Namely, in a rocker 100 of closed cross-section structure, separation of the joint Jh may occur due to buckling of flanges aligned in the left-right direction of a rocker inner 102 and a rocker outer 104. Such separation of the joining portion causes a drop in bending resistance because the closed cross-section collapse (opening up) and therefore, reinforcement of the framework itself and/or the joining portions is accordingly required.

Figure 4:
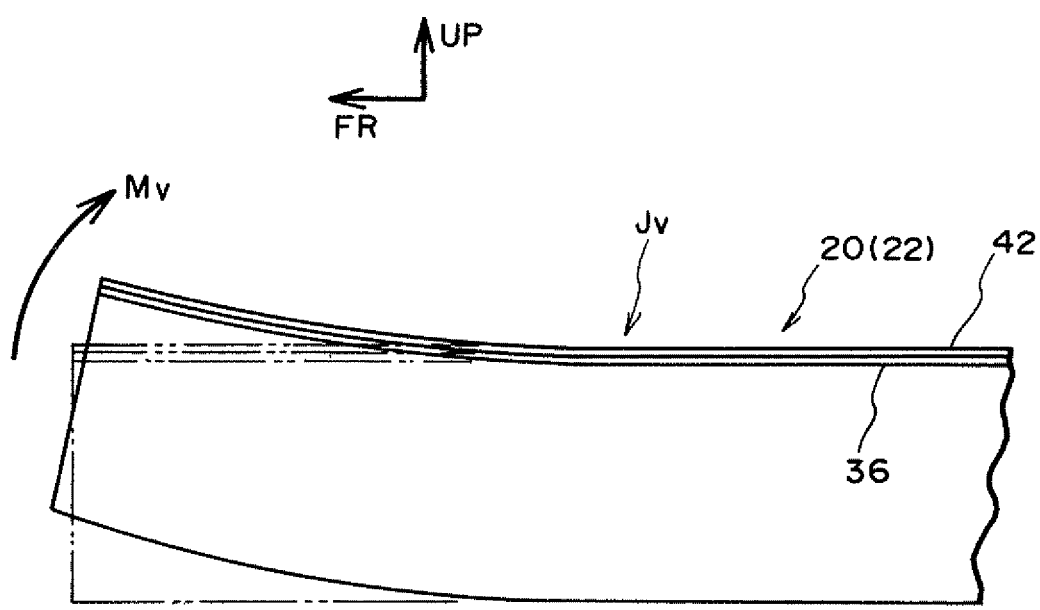
FIG. 4 is a schematic perspective view illustrating a deformation mode in event of a frontal collision of a rocker configuring a vehicle lower section structure according to an exemplary embodiment of the present invention.
Figure 5:
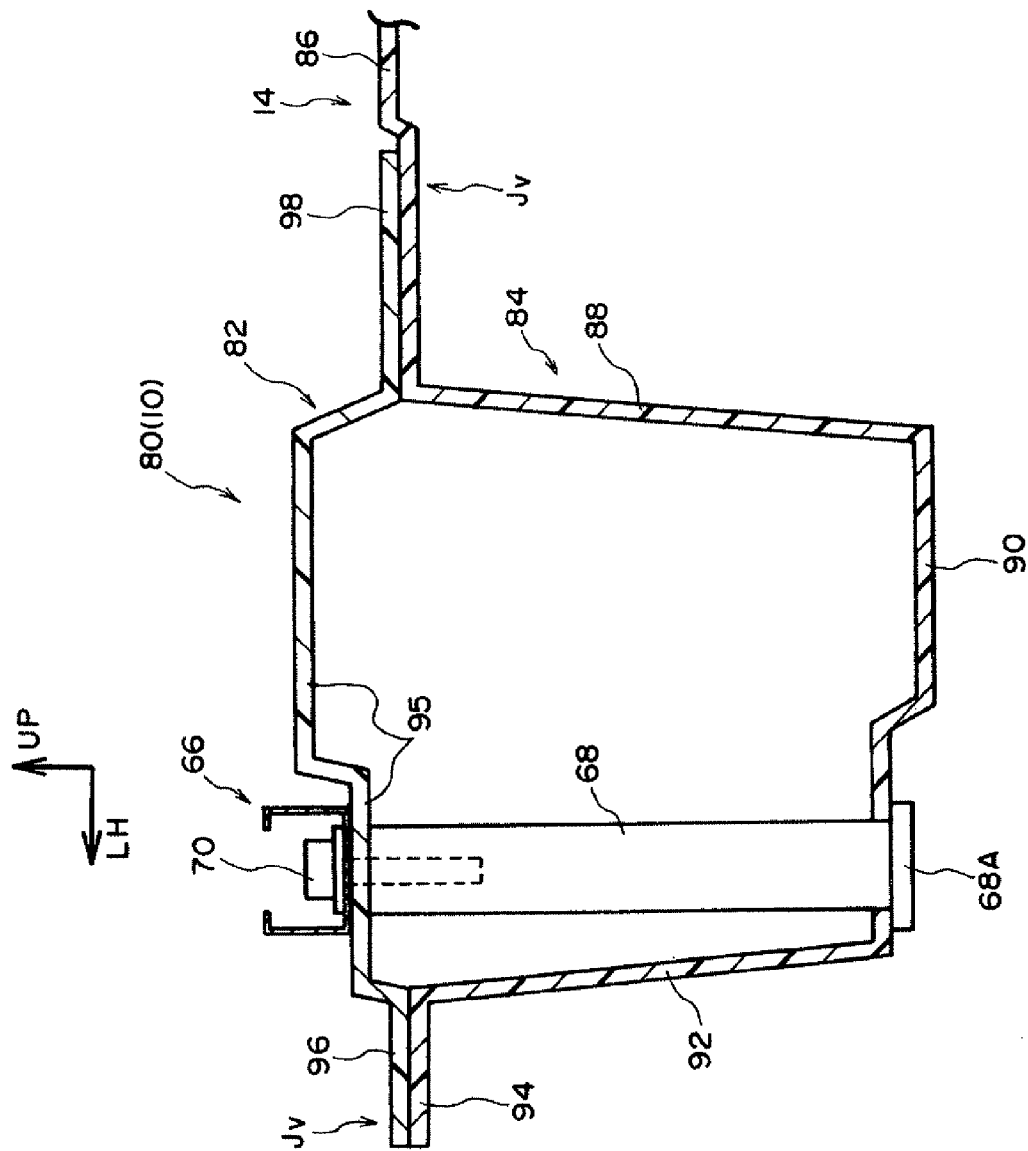
FIG. 5 is a cross-section taken at a right angle to the length direction illustrating a modified example of a rocker configuring a vehicle lower section structure according to an exemplary embodiment of the present invention.

However in the vehicle lower section structure 10, since the rockers 20 and the center framework portion 22 are configured by the upper panel 28 and the lower panel 30 that are joined together by the joining portions Jv that is aligned in the up-down direction as described above, deformation due to the bending moment Mv occurs as illustrated in FIG. 4. Namely, the joining portions Jv do not readily separate as a result of bending in the up-down direction since the joining portions Jv aligned in the up-down direction are bent in the plate thickness direction by the bending moment Mv. Collapse of cross-section structure of the rockers 20 and the center framework portion 22 caused by separation of the joining portions Jv is accordingly prevented or greatly reduced, rendering the reinforcement required in the Comparative Example described above unnecessary.

In the vehicle lower section structure 10, the collar nuts 68, that fasten and fix the seat rails 66 to the rockers 20 and the center framework portion 22, connect together the rocker upper walls 38 and the center upper wall 40 with the bottom wall 32, that respectively configure the facing walls of the closed cross-sections of the rockers 20 and the center framework portion 22. The rockers 20 and the center framework portion 22 are accordingly reinforced with respect to bending in the up-down direction.

Figure 6:
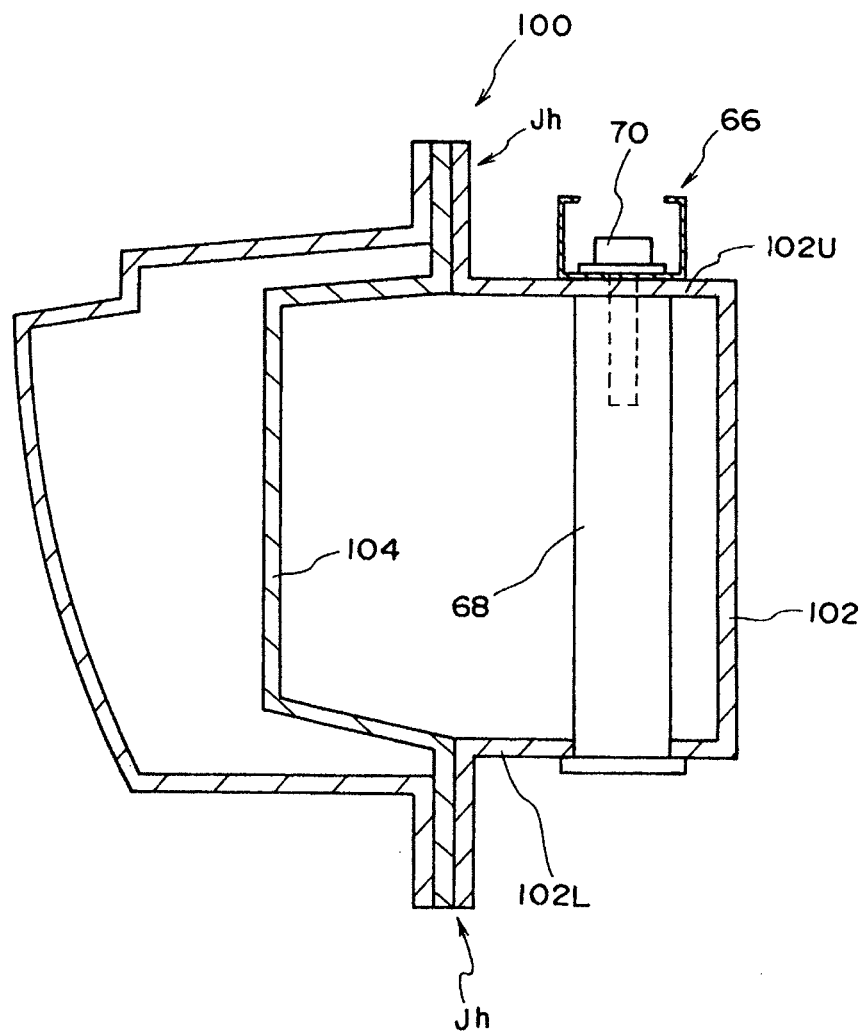
FIG. 6 is a cross-section taken at a right angle to the length direction illustrating a rocker structure according to a Comparative Example to an exemplary embodiment of the present invention.

As for example in the Comparative Example illustrated in FIG. 6, although an upper wall 102U and a lower wall 102L of the rocker inner 102 are connected together by a collar nut 68, no effect for maintaining a cross-section is obtained from the collar nut 68 with respect to the rocker 100. However in the vehicle lower section structure 10, the collar nuts 68 connect together the rocker upper walls 38 and the center upper wall 40 on the upper panel 28 side with the bottom wall 32 on the lower panel 30 side. In the vehicle lower section structure 10, deformation of the cross-section profile of the rockers 20 and the center framework portion 22 due to up-down bending can accordingly be suppressed. Namely, in addition to the reinforcement effect which is obtained by attaching the seat rails 66 (the increase in cross-section secondary moment), reinforcement with respect to bending is also achieved due to maintaining the cross-section profile of the rockers 20 and the center framework portion 22 by the collar nuts 68 (prevention of deformation of the cross-section profile). In particular, since the rocker upper walls 38 and the center upper wall 40 are parallel to the bottom wall 32, leaning and positional displacement of the collar nuts 68 due to bending in the up-down direction of the rockers 20 and the center framework portion 22 is suppressed (a braced state of the collar nuts 68 between the upper and lower walls is maintained). A high reinforcement effect for the rockers 20 and the center framework portion 22 can accordingly be obtained from the collar nuts 68.

Moreover, the vehicle lower section structure 10 has a simple structure with few components since the seat rails 66 are fixed to the rockers 20 and the center framework portion 22, with no need, for example, to provide separate fixing brackets for the seat rails 66. In other words, in the vehicle lower section structure 10, due to adopting a configuration in which the seat rails 66 are fixed directly to the rockers 20 and the center framework portion 22, the seat rails 66 contribute to reinforcement of the rockers 20 and the center framework portion 22.

The vehicle lower section structure 10 according to the present exemplary embodiment is accordingly capable of increasing the rigidity and strength of the rockers 20 and the center framework portion 22 that are long in the vehicle front-rear direction with a simple structure. Moreover, in the vehicle lower section structure 10, since the rockers 20 and the center framework portion 22 are formed by the joining portions Jv which is aligned in the up-down direction as described above, a configuration is achieved in which the rockers 20 and the center framework portion 22 are integrated with the floor 14. Namely, portion of the floor 14 excluding the rockers 20 and the center framework portion 22, the rockers 20, and the center framework portion 22 can be integrally formed by joining together the upper panel 28 and the lower panel 30, contributing to a further reduction in the number of components.

Note that there is no limitation to the shapes of the cross-section profiles of the rockers 20 and the center framework portion 22 in the above exemplary embodiment, and various shapes may be employed. For example, the configuration of the modified example illustrated in FIG. 5 may be employed. In the modified example illustrated in FIG. 5, a rocker 80 is configured by joining an upper floor 82 and a lower floor 84 which are aligned in the up-down direction.

Specifically, the lower floor 84 includes a floor panel 86 configuring a general portion of a floor 14, an inside wall 88 that drops downward from a vehicle width direction outer edge of the floor panel 86, a rocker lower wall 90 that extends from a lower edge of the inside wall 88 toward the vehicle width direction outside, an outside wall 92 that projects upward from a vehicle width direction outer edge of the rocker lower wall 90, and an outer flange 94 that extends from an upper edge of the outside wall 92 toward the vehicle width direction outside. The upper floor 82 includes a rocker upper wall 95 that faces the rocker lower wall 90, an outer flange 96 that extends from a vehicle width direction outer edge of the rocker upper wall 95 towards the vehicle width direction outside, and an inner flange 98 that extends from a vehicle width direction inner edge of the rocker upper wall 95 towards the vehicle width direction inside.

The rocker 80 has a closed cross-section structure enclosed by the inside wall 88, the rocker lower wall 90, the outside wall 92, and the rocker upper wall 95, and is formed by joining together the outer flange 94 of the lower floor 84 and the outer flange 96 of the upper floor 82 by for example bonding. A seat rail 66 is fastened and fixed to the rocker upper wall 95 by screwing bolts 70 onto collar nuts 68 that connect together the rocker lower wall 90 and the rocker upper wall 95.

The configuration according to the modified example that includes the rocker 80 in place of the rocker 20 enables similar advantageous effects to be obtained due to being similar in operation to the exemplary embodiment described above.

Note that in the above exemplary embodiment, an example has been given wherein the seat rails 66 at the vehicle width direction outside are fixed to the rockers 20, and the seat rails 66 at the vehicle width direction inside are fixed to the center framework portion 22, however the present invention is not limited thereto. For example configuration may be made wherein the seat rails 66 at the vehicle width direction outside are fixed to the rockers 20, and the seat rails 66 at the vehicle width direction inside are fixed to the floor 14 through, for example, brackets. As another example, the seat rails 66 at the vehicle width direction inside may be fixed to the center framework portion 22, and the seat rails 66 at the vehicle width direction outside may be fixed to the floor 14 through, for example, brackets.

Moreover, in the exemplary embodiment described above, the upper panel 28 and the lower panel 30 are configured from CFRP, however the present invention is not limited thereto. For example, the upper panel 28 and the lower panel 30 may be configured from a metal material such as steel plates.

Moreover, in the exemplary embodiment described above, the collar nuts 68 are employed as collar members, however the present invention is not limited thereto. For example, configuration may be made wherein circular cylinder shaped collars are employed as collar members, and bolts that penetrates the collars and nuts that screw onto these bolts may be employed such that the seat rails 66 is fastened to upper end sides of the collars and other components are fastened to the lower ends of the collars.

Needless to say, but appropriate modifications may be made to the present invention within a range not departing from the gist of the present invention.

The invention claimed is:

1. A vehicle lower section structure comprising:
   an upper panel comprising;
      an upper wall; and
      a pair of joining faces that respectively face downward in a vehicle vertical direction and that are separated from each other in a vehicle width direction;
   a lower panel including a lower wall and joining faces that face upward in the vehicle vertical direction; and
   one or more seat rails that extend in the vehicle front-rear direction and are fixed to a portion of the upper panel,
   wherein the upper panel and the lower panel comprise a framework structure that is long in a vehicle front-rear direction and has a closed cross-section by each of the joining faces of the upper panel being respectively joined to the joining faces of the lower panel, and the portion of the upper panel forms an upper wall of the framework structure,
   wherein the upper panel or the lower panel or both the upper panel and the lower panel extend in the vehicle width direction and configure at least a portion of a vehicle floor,
   wherein the upper panel and the lower panel extend from a dashboard lower portion that is a front end portion of the vehicle floor to a lower back portion that is a rear end portion of the vehicle floor,
   wherein the framework structure comprises:
      a rocker positioned at an outer edge side in the vehicle width direction of the vehicle floor; and
      a center framework portion positioned at a center portion of the vehicle floor in the vehicle width direction,
   wherein a seat rail at the outer edge side in the vehicle width direction is fixed to the upper wall of the framework structure that defines a closed cross-section of the rocker, and a seat rail at the center portion of the vehicle floor in the vehicle width direction is fixed to the upper wall of the framework structure that defines the closed cross-section of the center framework portion,
   wherein an upper wall of the rocker is formed by the upper panel and a lower wall of the rocker is formed by the lower panel, and
   wherein the rocker comprises side walls that extend between the upper wall and the lower wall thereof, the side walls being inclined relative to a vertical direction of a vehicle.

2. The vehicle lower section structure of claim 1, further comprising:
   a collar member comprising:
      an upper end side in the vehicle vertical direction that is fixed to the upper wall of the upper panel; and
      a lower end side in the vehicle vertical direction that is fixed to a lower wall of a lower panel that faces the upper wall;
   wherein the one or more seat rails are fastened to the collar member by a fastening, thereby fixing the seat rails to the upper wall of the framework structure.

3. The vehicle lower section structure of claim 2, wherein a portion of the upper wall of the upper panel to which the upper end side of the collar member is fixed and a portion of the lower wall of the lower panel to which the lower end side of the collar member is fixed are substantially parallel to each other.

4. The vehicle lower section structure of claim 1, wherein the side walls of the rocker are extended substantially diagonally parallel to each other.

* * * * *